United States Patent [19]
Sims-Barnes

[11] Patent Number: 5,975,910
[45] Date of Patent: Nov. 2, 1999

[54] LITERACY TRAINING DEVICE

[76] Inventor: Wanda L. Sims-Barnes, 78 Edgebrook Estates, Apt 12., Cheektowaga, N.Y. 14227

[21] Appl. No.: 08/966,663

[22] Filed: Nov. 10, 1997

[51] Int. Cl.[6] ............................ G09B 19/00; G09B 17/00; G09B 5/00
[52] U.S. Cl. ............................ 434/178; 434/156; 434/308
[58] Field of Search ................................ 434/156, 167, 434/169, 178, 308, 309, 317, 319; 281/51

[56] References Cited

U.S. PATENT DOCUMENTS

| | | | |
|---|---|---|---|
| 4,159,417 | 6/1979 | Rubincam | 235/375 |
| 4,809,246 | 2/1989 | Jeng | 434/317 |
| 4,884,974 | 12/1989 | DeSmet | 434/317 |
| 4,997,374 | 3/1991 | Simone | 434/317 |
| 5,209,665 | 5/1993 | Billings et al. | 434/169 |
| 5,290,190 | 3/1994 | McClanahan | 434/308 |
| 5,368,488 | 11/1994 | Gentile | 434/317 |
| 5,374,195 | 12/1994 | McClanahan | 434/317 |
| 5,484,292 | 1/1996 | McTaggart | 434/317 |
| 5,511,980 | 4/1996 | Wood | 434/169 |
| 5,520,544 | 5/1996 | Manico et al. | 434/317 |
| 5,531,600 | 7/1996 | Baer et al. | 434/317 |
| 5,538,430 | 7/1996 | Smith et al. | 434/178 |
| 5,631,885 | 5/1997 | Li | 369/31 |
| 5,803,748 | 9/1998 | Maddrell et al. | 434/317 |
| 5,810,604 | 9/1998 | Kopp, Jr. et al. | 434/317 |
| 5,851,119 | 12/1998 | Sharpe, III et al. | 434/317 |

*Primary Examiner*—Paul J. Hirsch
*Assistant Examiner*—Michael B. Priddy
*Attorney, Agent, or Firm*—Crossetta & Associates

[57] ABSTRACT

This invention relates to a device and system for augmenting the learning to read process, the device comprising a surface enabled for aligned placement of written terms arranged for reading in vertically spaced positions and a plurality of voice activating means arranged in registered alignment adjacent the spaced terms comprising the document such that upon actuation thereof, the device sounds out the pronunciation of a term contained in registered alignment at the position adjacent thereto.

25 Claims, 2 Drawing Sheets

LITERACY TRAINING DEVICE

This invention relates to a device for assisting a learning disabled student to learn to read by directly correlating pronunciation of words to the visual appearance of the word alone or in sentence structure. The device has particular utility in classroom reading instruction and enables a student to progress at his/her own personal speed, at his/her control and selection of material for reading.

BACKGROUND OF THE INVENTION

Learning speed and capability vary widely among students for many uncontrollable reasons. Such variations in the speed and capability, particularly of students learning to read, have been a problem in a modern society which relies upon a teaching professional to teach several students of diverse abilities in a classroom atmosphere. It is not unusual that some students in a mixed capability classroom are slower or less capable learners than others and are left behind as the faster and more capable learners advance. Thus, the teaching professional is left with the dichotomy of either slowing down the teaching process to accommodate the less skilled to the disadvantage of the more skilled, or maintaining a pace which allows the less skilled to fall behind. Attempts have been made to form classes into more closely equivalent learning groups, but such equivalency is difficult to assess and can still work to the disadvantage of those who fall marginally within the assessment boundaries.

Of particular concern are those students who may have learning disabilities which are severe and require constant repetition to overcome. Even in an ideally equivalent classroom structure, such students tend to need more personal supervision and input from the teaching professional. Such needs are time demanding and controvert the economies and efficiencies of classroom teaching. School systems have sought to resolve the problem by augmenting their classroom staff with reading and special education professionals who interact with individuals in separate sessions, in addition to and/or together with group classroom work. Such augmentation is expensive and can deny the disabled the full benefit of the classroom experience enjoyed by his/her classmates.

It is an object of the present invention to provide a device for augmenting reading skills which requires minimum supervision.

It is another object of the present invention to provide a device for augmenting reading skills which is controllable by the user.

It is still a further object of the present invention to provide a system for augmenting reading instruction which coordinates visual, hand and auditory senses.

These and other objects of the invention will be apparent from the following description of the invention.

SUMMARY OF THE INVENTION

The present invention comprises a device and system which augments the learning to read process, by correlating pronunciation of words to the visual appearance of words used in common sentence structure, at the repetitive control of the student.

Learning to read is a mental process which many believe to be significantly dependent upon the correlation of identifiable sounds, having a known auditory meaning, with the visual appearance of written words. The correlation of meaning to identifiably distinguished sounds, generally known as verbal communication, is typically readily accomplished by a human living in a social environment who is not otherwise physically impaired of speech, hearing and sight. The progression from verbal communication to an understanding of exacting standard of written words however, is a more difficult accomplishment generally requiring a more structured training. Subtle differences in the ability to hear and speak, which may be occasioned by physical and/or social impairments, can create differences in the ability to grasp the correlation of written and verbal communication, and differences of sight, particularly the mental processing of letters and numbers, can become extraordinary impairments to the learning to read process. One way to overcome these various differences and advance the learning process is to provide repetitious correlation of sound and sight to the student in a personalized controlled environment.

The device of the present invention generally comprises a housing enabled for aligned placement of a document comprising one or more written terms arranged for reading in vertically spaced positions, with a plurality of actuators, arranged in registered alignment adjacent the spaced terms comprising the document. Engaging an actuator enables a voice synthesizing means, in operational arrangement with said actuator, to generate an audible voice pronunciation of a transcribed term contained on the document adjacent the actuator.

By document is meant one or more pages, sheets or the like containing one or more transcribed terms intended for reading. A term may be a number, an alphabetic letter, word, phrase, sentence, partial sentence, paragraph or the like. By transcribed is meant that the term is written, printed or the like in any suitable font of the language in which the user desires to learn to read. The actuating means are arranged such that upon activation, the voice synthesizing means sounds out a vocal pronunciation of a term contained in registered alignment at the position adjacent thereto.

In a preferred embodiment, engaging an actuator institutes a visual signal identifying the term being sounded out. In a further preferred embodiment, a light signals the term being sounded out, in one embodiment the light being aligned with the line being sounded out and in a preferred embodiment the light being arranged behind a translucent paper document or the like which illuminates the term and/or various parts thereof as the term is sounded out.

The device of the invention can be dedicated to a particular document or can be adaptable for application to various diverse documents for reading. In a preferred embodiment, the device comprises separable units, preferably a base unit and a signal generating unit (SGU). In such embodiment, the base unit generally contains the means for controlling operation of the device and generally includes the voice actuator, means for generating the auditory response to be heard by the user in reference to documents intended for reading, and means enabling signaling terms being sounded out. The SGU is preferably a portable unit specific to one or more particular document(s) intended for reading and generates a signal that is used by the base unit to enable generating an auditory response.

In a preferred embodiment, the SGU is removably mounted to the base unit and comprises means for mounting a document with spaced positions of the document in registered alignment with voice actuating means of the base unit and in electronic communication with the base unit. In a particularly preferred embodiment, the SGU contains one or more memory chips arranged to generate a signal upon activation from an actuator of the base unit and preferably, means to distinguish among different documents and/or terms therein. The document mountable to the SGU, generally comprises spaced lines of written terms intended for reading. The arrangement among the SGU, its memory chips and the document being one wherein a line containing a term in a document is aligned with an actuator which enables activation of a circuit in a memory chip which generates a distinguished signal transmission to the base unit. Multiple different documents can be aligned to the SGU with the same or different memory chips comprising circuitry which enables differential signals, representing different terms, to be provided to the voice synthesizer.

Thus, for example, a base unit may comprise an arrangement of 20 actuators vertically spaced for registered alignment with 20 spaced lines of a document page. The SGU is arranged to be mounted to the base unit with a document comprising spaced lines corresponding to the arrangement of the actuators of the base unit and in enabled electronic communication with the base unit. The SGU comprises memory chips which are enabled to generate a signal upon actuation by the spaced actuators of the base unit. The SGU distinguishes which memory chip and/or portion thereof is actuated by an actuator with reference to which document is present for viewing.

In a preferred embodiment, the configuration of a memory chip comprises multiple distinguished signal generating capability, each of which may be separately actuatable. The SGU distinguishes among documents and enables distinguished signal generation from the memory chip upon actuation at a registered position among the various documents. Thus, a memory chip may be dedicated to a particular position and provide a distinguished signal upon actuation depending upon which document is mounted to the SGU. For example, in one typical such embodiment, a memory chip is enabled to be programmed for about 20 seconds of voice actuating signal. Thus, each chip may enable the recitation of about 10 different terms, which upon distinguished activation will enable about 10 different pages of written document having terms at the actuating position which is served by such memory chip.

DESCRIPTION OF THE PREFERRED EMBODIMENT

Figure 1:
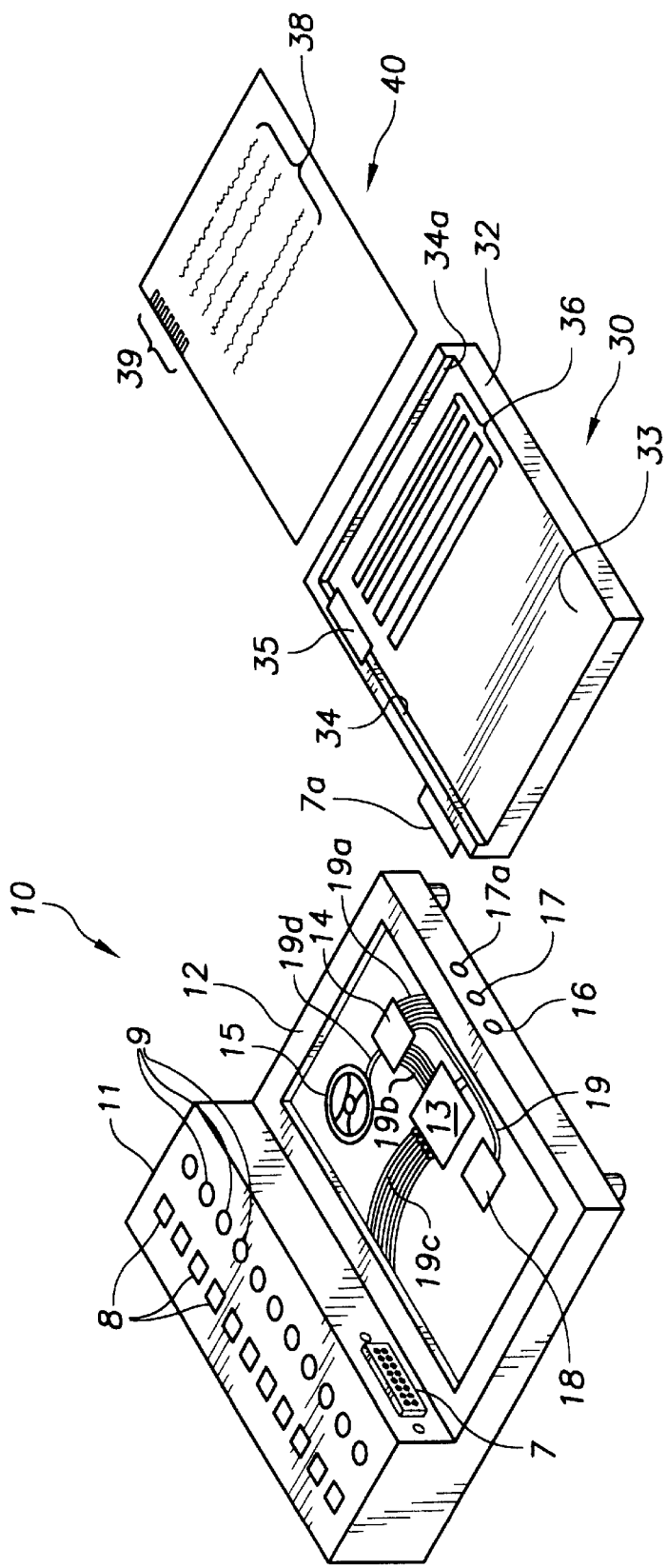
FIG. 1 is an exploded perspective view of a device of the invention.

Referring now to the drawings, therein FIG. 1 illustrates an embodiment of the invention shown as comprising a base unit 10 and SGU 30 sized for compatible mounting thereto. Document 40 is also illustrated, it comprising a plurality of spaced terms 38, arranged for visual study by the user.

Base unit 10 is illustrated as comprising the power supply and means for user control of the operation of the device, and generally includes an actuator housing 11 containing a plurality of voice actuator switches 8 and light indicators 9 arranged linearly along the length thereof in corresponding registered alignment, and an SGU support frame 12. Support frame 12 is sized for mounting SGU 30 thereto and generally comprises a signal receiving/converting module 13, amplification module 14, speaker 15, headphone jack 16, tone control 17, volume control and unit on/off switch 17a, power supply 18 and connecting wiring 19, 19a, 19b, 19c and 19d. Actuator housing 11 comprises ribbon wire connector 7, which is sized to engage a mating ribbon wire connector 7a of SGU 30.

SGU 30 is illustrated as comprising housing 32 having a surface 33 for mounting document 40 thereto, ribbon wire connector 7a which is sized to mate with ribbon wire connector 7 of base unit 10, document alignment shoulders 34 and 34a and document register 35. In the illustrated embodiment, SGU 30 is also shown as comprising a plurality of lens 36, which are arranged in spaced arrangement generally corresponding to the spaced terms comprised on document 40. Lens 36 have one or more lights (not shown) behind them which are in circuitry coordinated to illuminate the lens as a term or a portion thereof of the document is being sounded out by the device.

In the illustrated embodiment, document 40 is translucent and the reader perceives the term or portion thereof as being illuminated in coordination with the sounding out of the term by the device. Document alignment shoulder 34 is provided to assure a document is properly aligned to the SGU with terms thereon corresponding to appropriate voice actuators 8 and light indicators 9.

Document register 35 is illustrated as being a multi-terminal card connector, which is arranged to close distinguished circuitry within the SGU upon engagement with mating conductive pieces 39 arranged along a document mounted in registered alignment to the SGU. Thus, multiple documents containing different terms or portions thereof would contain different arrangements of conductive pieces which would close/open different circuitry within the SGU when engaging the multi-terminal connector.

Figure 2:
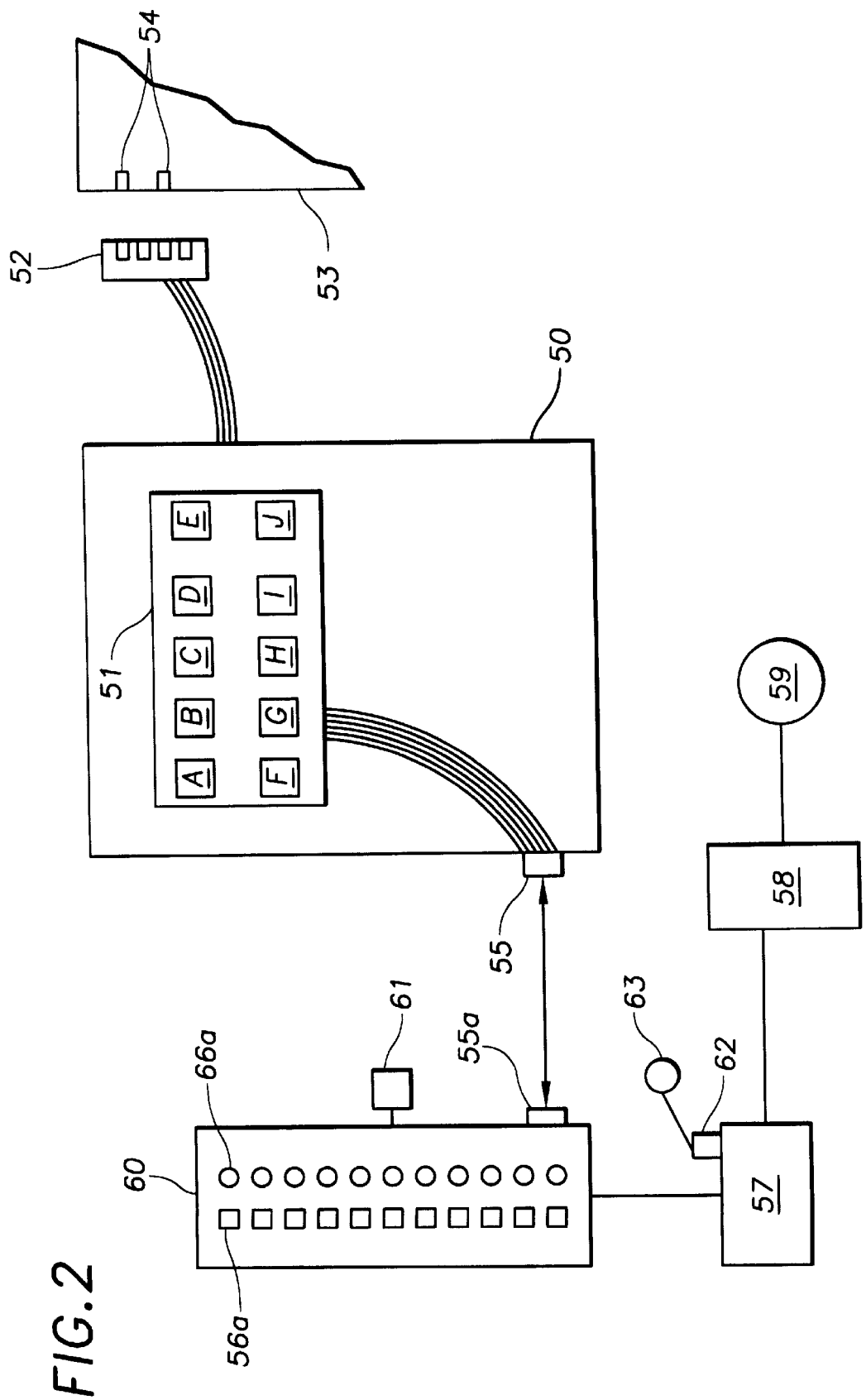
FIG. 2 is a schematic illustration of the electronic interaction of the components of a device of the invention.

FIG. 2 illustrates the electronic interaction of the components. Therein, base unit 60 comprises a power source 61 for the device and is enabled for coordinated operation with a plurality of SGU's. In operation, an SGU is specific to terms contained on one or a plurality of documents which may be mounted thereto. SGU 50 comprises computer chip memory circuitry 51 which is distinguished to both a plurality of documents and a plurality of terms contained in each document.

In the illustrated embodiment, the computer chip memory circuitry exemplified in the SGU comprises generic memory of 12 lines of terms for one or more pages of each of 10 different documents. Multi-terminal card connector 52 is in enabling circuitry with memory circuits 51 in an arrangement to selectively enable one or more of the 10 distinct subgeneric memory circuits, illustrated as memory modules A–J, as defined by engagement with a document page mounted to the SGU.

In the illustrated embodiment, an identified document page 53 has a registered arrangement of conductive pieces 54 which enables a particular identified sub-generic memory module and circuitry, for example module "A" of the SGU, when mounted to the multi-terminal card connector. Ribbon wire connector 55 of the SGU engages connector 55a of the base unit which places its bank of voice actuator switches and signal indicators in circuitry with the particularly identified sub-generic memory circuitry of the SGU which is enabled by the conductive pieces of the identified document mounted to the SGU. Engagement of a voice actuator switch, for example 56a, engages the identified sub-generic memory circuitry in the SGU, and circuitry of 51 activates a specific memory address of "A" which is distinguished by the location of the term in registered alignment with the activating switch.

Simultaneously therewith, indicator light 66a illuminates and the specific memory address in the SGU representing the term generates a signal which is transmitted through connector 55/55a to signal receiving module 57 of the base unit. Receiving module 57 converts said signal and sends the converted signal to amplification module 58, which amplifies the same and sends it to speaker 59 and/or a head phone jack and the like for voice output to the reader. Coincidentally, the generated signal is identified by sensor 62, which enables illumination of one or more lights 63 under a lens on the SGU adjacent the voice actuation switch illuminates and is seen through the translucent document by the reader which identifies the term or portion thereof being sounded out by the device.

While certain present preferred embodiments have been shown and described, it is distinctly understood that the invention is not limited thereto but may be otherwise embodied within the scope of the following claims.

I claim:

1. A reading device comprising:

a housing;

means for mounting a document to said housing, said document comprising a plurality of terms transcribed thereon which are arranged in spaced positions for reading;

a plurality of actuators arranged in spaced registered alignment adjacent spaced terms transcribed on said document, and enabled to activate a voice synthesizing means;

voice synthesizing means, in operational arrangement with said actuators, said synthesizing means enabled to generate an audible voice pronunciation of a term transcribed on said document upon actuation by an actuator in registered alignment with the term being pronounced; and, means arranged to designate the transcribed term being pronounced, the designation being correlated with the voice pronunciation of said term.

2. A reading device of claim 1 wherein said voice synthesizing means is enabled to generate an audible voice pronunciation of two or more different transcribed terms contained on one or more documents.

3. A reading device of claim 1 wherein said voice synthesizing means comprises a voice recording.

4. A reading device of claim 1 wherein said voice synthesizing means comprises a programmable computer chip.

5. A reading device of claim 1 wherein a computer chip is enabled to generate a signal in response to activation by an actuator, which signal enables the audible voice pronunciation of a term transcribed on said document.

6. A reading device of claim 5 wherein said computer chip is enabled to generate a plurality of differential signals which enable the audible voice pronunciation of a plurality of different transcribed terms.

7. A reading device of claim 6 wherein said computer chip is activated to produce a signal by a plurality of actuators.

8. A reading device of claim 7 wherein each of said plurality of actuators, activates said computer chip to generate a different signal.

9. A reading device of claim 6 wherein said computer chip is activated by a single actuator.

10. A reading device of claim 9 wherein said computer chip is enabled to generate different signals, when different transcribed terms are arranged adjacent said actuator.

11. A reading device of claim 5 wherein said computer chip signal is converted and amplified to generate an audible voice sound.

12. A reading device of claim 1 wherein said housing comprises a base unit and a signal generating unit, said signal generating unit comprises enabling means to generate a signal upon activation by an actuator, said base unit contains an actuator in enabling communication with said enabling means and comprises means for converting said signal to enable a synthesized voice sound comprising pronunciation of a term transcribed on said document.

13. A reading device of claim 12 wherein said signal generating unit comprises means for mounting a readable document thereto having a plurality of spaced terms in registered alignment with a plurality of actuators.

14. A reading device of claim 13 wherein said signal generating unit mounts to said base unit and said base unit comprises a plurality of actuators arranged in spaced registered alignment adjacent transcribed terms of said document mounted to said signal generating unit.

15. A reading device of claim 1 comprising means arranged to distinguish among different documents mounted to said device, and enable said voice synthesizing means to generate different voice responses when a different transcribed term is arranged adjacent said actuator.

16. A reading device of claim 15 wherein said means arranged to distinguish engages a document.

17. A reading device of claim 1 comprising means arranged to visually identify a term actuated by an actuator.

18. A reading device of claim 17 wherein said means arranged to visually identify, illuminates.

19. A reading device comprising the combination of:

a housing;

means for removably mounting a document to said housing;

a document comprising a plurality of transcribed terms arranged for reading in spaced positions;

a plurality of switches arranged to be in spaced registered alignment adjacent transcribed terms of said document when said document is mounted to said housing;

voice synthesizing means, in operational circuitry with said switches and enabled to generate an audible voice pronunciation of a transcribed term contained on said document;

wherein a switch in registered alignment adjacent a transcribed term enables the generation of an audible voice pronunciation of the adjacent transcribed term.

20. The combination of claim 19 comprising a programmable computer chip.

21. The combination of claim 20 comprising circuitry which enables said computer chip to generate a signal in response to selective activation by a switch, said signal enabling an audible voice pronunciation of a term transcribed on said document.

22. The combination of claim 20 wherein said housing comprises a base unit and a signal generating unit, said signal generating unit comprises a computer chip enabled to generate a signal upon activation by a switch, said base unit contains a switch in enabling communication with said computer chip and comprises means for converting said signal to enable a synthesized voice sound comprising pronunciation of a term transcribed on said document.

23. The combination of claim 22 wherein said signal generating unit comprises means for readably mounting said document thereto, said signal generating unit removably mounts to said base unit, and said base unit comprises a plurality of switches arranged in spaced registered alignment adjacent transcribed terms of said document mounted to said signal generating unit.

24. A system for learning to read comprising:

providing a device containing a plurality of linearly spaced, manually engagable actuators, said actuators being in enabling electrical circuitry for activating voice synthesizing means upon engagement;

providing voice synthesizing means, in operational arrangement with said actuators, said synthesizing means enabled to generate an audible voice pronunciation of a transcribed term contained on a document mounted adjacent an actuator upon actuation by said actuator;

providing means arranged to designate a transcribed term on said document correlated with generation of an audio voice pronunciation of the designated term:

mounting a document suitable for reading to said device, said document comprising a plurality of transcribed terms arranged for reading in spaced registered alignment adjacent said actuators;

engaging an actuator positioned adjacent a transcribed term contained on said document and hearing an audible pronunciation of said transcribed term generated by said audible voice synthesizing means, coincidentally with designation of the transcribed term being pronounced.

25. The system of claim 24 wherein upon engaging an actuator, a term adjacent thereto is visually identified by illumination.

* * * * *